(12) United States Patent  (10) Patent No.: US 8,040,404 B2
Hagiwara                    (45) Date of Patent:    Oct. 18, 2011

(54) IMAGE PICKUP APPARATUS, IMAGE SIGNAL PROCESSING CIRCUIT AND IMAGE SIGNAL PROCESSING METHOD AS WELL AS COMPUTER PROGRAM

(75) Inventor: Shigeru Hagiwara, Kanagawa (JP)

(73) Assignee: Sony Corporation, Tokyo (JP)

( * ) Notice: Subject to any disclaimer, the term of this patent is extended or adjusted under 35 U.S.C. 154(b) by 423 days.

(21) Appl. No.: 12/237,711

(22) Filed: Sep. 25, 2008

(65) Prior Publication Data

US 2009/0086051 A1   Apr. 2, 2009

(30) Foreign Application Priority Data

Sep. 27, 2007 (JP) .............................. P2007-250686

(51) Int. Cl.
   *H04N 5/228* (2006.01)
   *H04N 1/38* (2006.01)
   *H04N 1/40* (2006.01)
   *H04N 9/64* (2006.01)
(52) U.S. Cl. ..................... 348/243; 348/222.1; 358/463; 358/443
(58) Field of Classification Search .................. 348/238, 348/303, 304, 316, 321, 323, 222.1, 234, 348/243, 241, 333.01, 333.11, 251, 300, 348/219.1; 358/463, 443
See application file for complete search history.

(56) References Cited

U.S. PATENT DOCUMENTS

| 6,600,519 B1* | 7/2003 | Hwang ......................... 348/673 |
| 2004/0252204 A1* | 12/2004 | Kurane ....................... 348/222.1 |
| 2007/0139539 A1* | 6/2007 | Ohara et al. ................. 348/243 |

FOREIGN PATENT DOCUMENTS

| JP | 2001 223947 | 8/2001 |
| JP | 2004 128716 | 4/2004 |
| JP | 2004 350202 | 12/2004 |
| JP | 2006 86971 | 3/2006 |

* cited by examiner

*Primary Examiner* — Jason Chan
*Assistant Examiner* — Stephen Coleman
(74) *Attorney, Agent, or Firm* — Frommer Lawrence & Haug LLP; William S. Frommer; Ellen Marcie Emas

(57) ABSTRACT

The present invention provides an image pickup apparatus, including: an image pickup section of the plural channel output type configured to output signals individually corresponding to divisional regions of an image pickup device; a plurality of signal processing sections configured to individually receive the output signals of the plural channels of the image pickup device as inputs thereto to produce digital data corresponding to pixel values, and a digital signal processing section configured to receive the pixel value data produced by the signal processing sections as inputs thereto to execute an image correction process.

8 Claims, 10 Drawing Sheets

IMAGE PICKUP APPARATUS, IMAGE SIGNAL PROCESSING CIRCUIT AND IMAGE SIGNAL PROCESSING METHOD AS WELL AS COMPUTER PROGRAM

CROSS REFERENCES TO RELATED APPLICATIONS

The present invention contains subject matter related to Japanese Patent Application JP 2007-250686, filed in the Japan Patent Office on Sep. 27, 2007, the entire contents of which being incorporated herein by reference.

BACKGROUND OF THE INVENTION

This invention relates to an image pickup apparatus, an image signal processing circuit, an image signal processing method and a computer program, and more particularly to an image pickup apparatus, an image signal processing circuit, an image signal processing method and a computer program wherein an image pickup device has a plurality of divisional regions and signal processing is carried out individually for output signals from the divisional regions to carry out black level adjustment for the divisional regions.

DESCRIPTION OF THE RELATED ART

A CCD (Charge Coupled Device) unit, a CMOS (Complementary Metal Oxide Semiconductor) unit and so forth are widely used for an image pickup device for use, for example, with a video camera or a still camera. For example, an existing popular CCD unit receives light of pickup image information for one screen by means of a great number of photodetectors (PDs) thereof and reads out charge signals obtained by photoelectric conversion from the photodetectors through a vertical register and a horizontal register. Then, the CCD unit converts the read out charge signals into a data stream and outputs the resulting data stream from one output channel. Such a one-channel output type CCD unit and a signal processing configuration as just described are described below with reference to FIG. 1.

The CCD unit 10 shown includes a vertical register 11 for transferring charge accumulated in a plurality of photodetectors (PDs) as image pickup elements in a vertical direction, a horizontal register 12 for transferring the charge transferred by the vertical register 11 one by one line in a horizontal direction, and an output amplifier 13 for converting the charge of the horizontal register 12 into a voltage. The output of the output amplifier 13 is inputted to a signal processing section 21.

The signal processing section 21 includes a CDS circuit for executing removal of noise from within an input signal, an ADC section for carrying out AD conversion, and so forth. A digital signal obtained by the signal processing of the signal processing section 21 is inputted to a digital signal processor (DSP) 22, by which an output image production process including a pixel value correction process is carried out. A resulting signal is outputted from the DSP 22, and as a result, such an output image 30 as seen in FIG. 1 is obtained.

In recent years, increase of the size of image pickup devices has proceeded for increase of the number of component pixels of an image, and also the frame rate of an output image has been raised. In such an image pickup device having a single output amplifier as shown in FIG. 1, in order to maintain a high frame rate, it is necessary to output an image at a higher speed. However, further increase of the speed is difficult due to a physical limit. Therefore, a configuration has been proposed which includes a plurality of output amplifiers set to an image pickup device to improve the throughput to allow higher-speed outputting of an image. For example, if a CCD unit is divided into two regions for 2-channel outputs such that different outputs are obtained from the individual divisional regions, then signal processing of output data can be carried out using an operation frequency equal to one half that used where an output of one channel is used.

A CCD unit and a signal processing configuration ready for 2-channel outputs are described with reference to FIG. 2. The CCD unit 50 shown includes a vertical register 51 for transferring charge accumulated in photodetectors (PDs) in a vertical direction, and two horizontal registers 52 and 53 for transferring the charge transferred by the vertical register 51 one by one line in horizontal directions. The first horizontal register 52 receives outputs of those ones of the photodetectors which are included in the left half region in FIG. 2 while the second horizontal register 53 receives outputs of those ones of the photodetectors which are included in the right half region in FIG. 2.

The accumulated data of the first horizontal register 52 are converted into voltages by an output amplifier 54 and inputted to a signal processing section 62. Meanwhile, the accumulated data of the second horizontal register 53 are converted into voltages by another output amplifier 55 and inputted to another signal processing section 61. The two signal processing sections 62 and 61 process the output data of the component pixels of the left and right halves of the CCD unit parallelly. High-speed processing is implemented by the process just described.

The digital signals processed by the signal processing sections 61 and 62 are inputted to a digital signal processor DSP 63, by which a production process for an output image including a pixel value correction process and so forth is carried out. The produced output image is outputted from the DSP 63. As a result, for example, such an output image 70 as shown in FIG. 2 is obtained.

The signal processing sections 61 and 62 process output data of half ones of the component pixels of the CCD unit parallelly to produce digital data of, for example, 14 bits each representative of a pixel value level of a component pixel. Upon this processing, a clamp level value, that is, a clamp level value or dark current value to be used for adjustment of the black level, is inputted from a control section (MPU) not shown to carry out pixel value adjustment thereby to determine a black level.

However, with such a configuration having an image pickup section of 2-channel outputs as described above, the left and right CCD output signal levels are different originating from a characteristic difference of the output amplifiers provided for the different regions of the CCD unit. Accordingly, even if an equal clamp level value is provided for the left and right images from the control section (MPU), it is difficult to make the black levels of the left and right images coincide with each other. As a result, an image having different black levels in the left and right image regions thereof is outputted.

A black level adjustment method for an image pickup device having a plurality of channel outputs is disclosed in Japanese Patent Laid-Open No. 2006-86971 (hereinafter referred to Patent Document 1). In the black level adjustment method of Patent Document 1, the clamp level is determined making use of current value data, that is, dark current value data, of optical black (OB) regions formed on an image pickup device having a plurality of outputs, that is, of optical black (OB) regions set as light intercepting regions around an effective image region. A plurality of data obtained from the optical black (OB) regions corresponding to all channels corresponding to the image regions are averaged, and a difference between the average data and a target clamp level is calculated to determine a final clamp level. However, with such a configuration which uses an average value as described above, in such a case that the linearity of an image signal differs between the different channels, an inappropriate clamp level may be set for each image region.

SUMMARY OF THE INVENTION

Therefore, it is desirable to provide an image pickup apparatus, an image signal processing circuit, an image signal processing method and a computer program by which, upon signal processing for output signals from an image pickup device such as a CCD unit or a CMOS unit having a plurality of divisional outputs, appropriate black level adjustment can be carried out for each divisional region.

Further, it is desirable to provide an image pickup apparatus, an image signal processing circuit, an image signal processing method and a computer program by which, even where the output characteristics of different channels have a delicate difference, black level setting and color reproduction with fidelity can be achieved.

To this end, according to the present invention, clamp levels of optical black (OB) region data of the channels corresponding to divisional regions of an image pickup device are detected, and the detected clamp levels are applied to carry out a signal process for the individual channels.

In particular, according to an embodiment of the present invention, there is provided an image pickup apparatus includes an image pickup section of the plural channel output type configured to output signals individually corresponding to divisional regions of an image pickup device. A plurality of signal processing sections configured to individually receive the output signals of the plural channels of the image pickup device as inputs thereto to produce digital data corresponding to pixel values, and a digital signal processing section configured to receive the pixel value data produced by the signal processing sections as inputs thereto to execute an image correction process. The digital signal processing section being configured to receive, in the image correction process for the divisional regions, correction parameters individually corresponding to the divisional regions to carry out image correction, each of the correction parameters being a sum value of (a) a clamp level value corresponding to that one of the divisional regions which is an object of correction and (b) a difference value between the clamp level value corresponding to the divisional region which is an object or correction and a target black level. The digital signal processing section being further configured to determine black levels based on the correction parameters inputted thereto and execute image correction with reference to the determined black levels.

Preferably, the digital signal processing section includes a gain control section configured to execute a level extension process of selecting, from among component pixels in input image data thereto, only those pixels which have a pixel value higher than the target black level and extending a section of input pixel values by gain control, and outputs resulting data of the gain control for the pixels which have a pixel value higher than the target black level and pixel values of those of the component pixels of the input image which have a pixel value lower than the target black level while the pixel values are maintained.

The image pickup apparatus may be configured such that the image pickup section includes, as the image pickup device thereof, an image pickup device of the two-part type capable of outputting a left image and a right image and outputs a plurality of output signals individually corresponding to the left image and the right image. The digital signal processing section being configured to receive, in the image correction process for the divisional regions, the correction parameters individually corresponding to the divisional regions as inputs thereto and carry out the image correction to execute the image correction such that, in the process wherein the left image is determined as the object of processing. The digital signal processing section receives a sum value of (La) a clamp level corresponding to the left image and (Lb) a difference value between the clamp level value corresponding to the left image and the target black level as the correction parameter as an input thereto and executes the image correction with reference to a black level determined based on the correction parameter whereas, in the process wherein the right image is determined as the object of processing. The digital signal processing section receives a sum value of (Ra) a clamp level corresponding to the right image and (Rb) a difference value between the clamp level value corresponding to the right image and the target black level as the correction parameter as an input thereto and executes the image correction with reference to a black level determined based on the correction parameter.

In this instance, preferably the digital signal processing section utilizes correction difference values which are sums of externally inputted correction amounts individually corresponding to the left and right images and the corresponding difference values as component data of the correction parameters to execute the processes.

According to another embodiment of the present invention, there is provided an image signal processing circuit includes a plurality of signal processing sections configured to individually receive signals corresponding to divisional regions of an image pickup device as inputs thereto to produce digital data corresponding to pixel values, and a digital signal processing section configured to receive the pixel value data produced by the signal processing sections as inputs thereto to execute an image correction process. The digital signal processing section being configured to receive, in the image correction process for the divisional regions, correction parameters individually corresponding to the divisional regions to carry out image correction, each of the correction parameters being a sum value of (a) a clamp level value corresponding to that one of the divisional regions which is an object of correction and (b) a difference value between the clamp level value corresponding to the divisional region which is an object or correction and a target black level, the digital signal processing section being further configured to determine black levels based on the correction parameters inputted thereto and execute image correction with reference to the determined black levels.

According to a further embodiment of the present invention, there is provided an image signal processing method executed by an image processing apparatus, includes a signal processing step executed by a plurality of signal processing sections of individually receiving signals corresponding to divisional regions of an image pickup device as inputs thereto to produce digital data corresponding to pixel values, and a digital signal processing step executed by a digital signal processing section of receiving the pixel value data produced by the signal processing sections as inputs thereto to execute an image correction process. The digital signal processing step includes reception, in the image correction process for the divisional regions, of correction parameters individually corresponding to the divisional regions to carry out image correction, each of the correction parameters being a sum value of (a) a clamp level value corresponding to that one of the divisional regions which is an object of correction and (b) a difference value between the clamp level value corresponding to the divisional region which is an object or correction and a target black level, the digital signal processing step further includes determination of black levels based on the correction parameters inputted thereto and execution of image correction with reference to the determined black levels.

According to a still further embodiment of the present invention, there is provided a computer program for causing an image processing apparatus to execute an image signal process, includes a signal processing step executed by a plurality of signal processing sections of individually receiving signals corresponding to divisional regions of an image pickup device as inputs thereto to produce digital data corresponding to pixel values, and a digital signal processing step executed by a digital signal processing section of receiving the pixel value data produced by the signal processing sections as inputs thereto to execute an image correction process. The digital signal processing step includes reception, in the image correction process for the divisional regions, of correction parameters individually corresponding to the divisional regions to carry out image correction, each of the correction parameters being a sum value of (a) a clamp level value corresponding to that one of the divisional regions which is an object of correction and (b) a difference value between the clamp level value corresponding to the divisional region which is an object or correction and a target black level, the digital signal processing step further includes determination of black levels based on the correction parameters inputted thereto and execution of image correction with reference to the determined black levels.

It is to be noted that the computer program of the present invention is a computer program which is provided in a computer-readable form, for example, to a general-purpose computer system which can execute various program codes and which can be provided by a storage medium and a communication medium. By providing such program in a computer-readable form, processes according to the program are implemented on the computer system.

With the image pickup apparatus, image signal processing circuit, image signal processing method and computer program, where output signals corresponding to divisional regions of an image pickup device are inputted to execute a correction process therefore. The digital signal processing section (DSP) receives correction parameters individually corresponding to the divisional regions as inputs thereto to carry out image correction. In particular, the digital signal processing section receives, as each of the parameters, a sum value of (a) a clamp level value corresponding to that one of the divisional regions which is an object of correction and (b) a difference value between the clamp level value corresponding to the divisional region which is an object or correction and a target black level, as an input thereto. Then, the digital signal processing section executes image correction with reference to a black level determined based on the received correction parameter. By the configuration described, even if a level difference originating from a dispersion of the output amplifier characteristic of the image pickup device exists between the regions, since adjustment of the black level is carried out by a process to which the correction parameter for each region, appearance of an offset of the black level between the image regions is prevented and image data of high quality can be outputted.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

In the following, details of an image pickup apparatus, an image signal processing circuit, an image signal processing method and a computer program according to an embodiment of the present invention are described with reference to the accompanying drawings. First, an example of a configuration of the image pickup apparatus and the image signal processing circuit according to an embodiment of the present invention is described with reference to FIG. 3.

Figure 1:
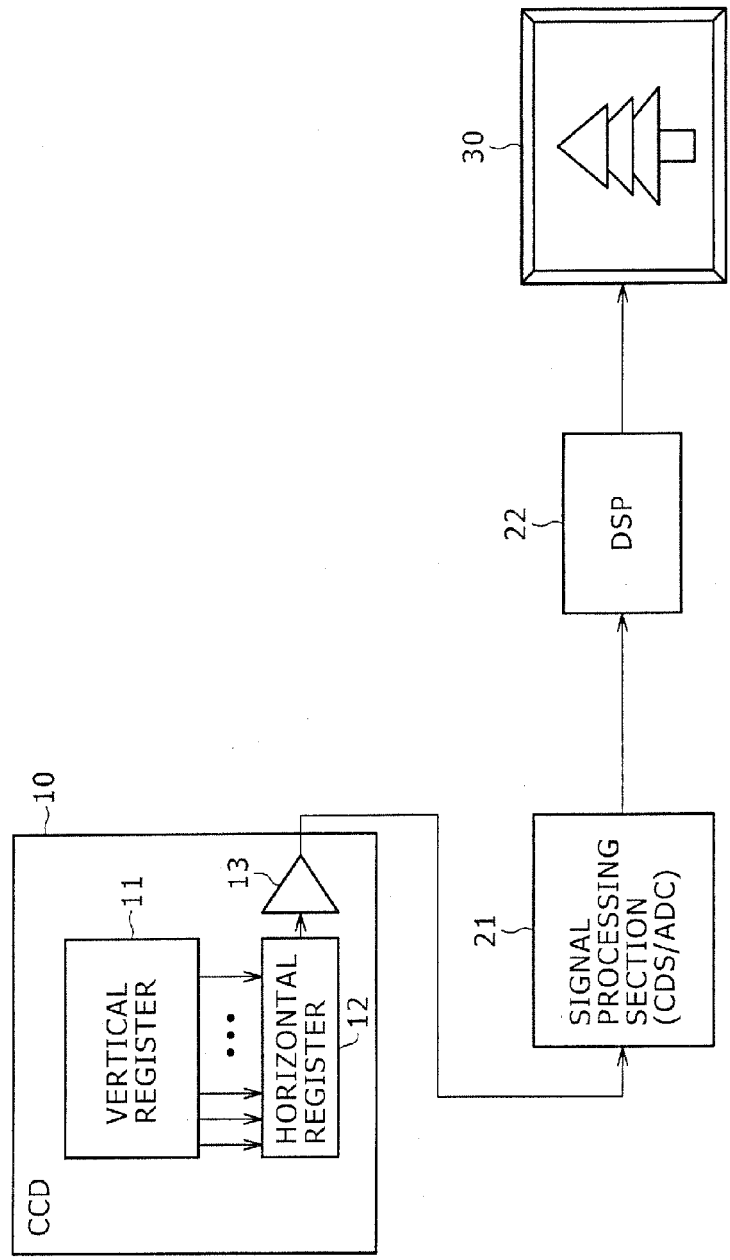
FIG. 1 is a block diagram showing a CCD unit of the one-channel output type and an associated signal processing configuration.
Figure 2:
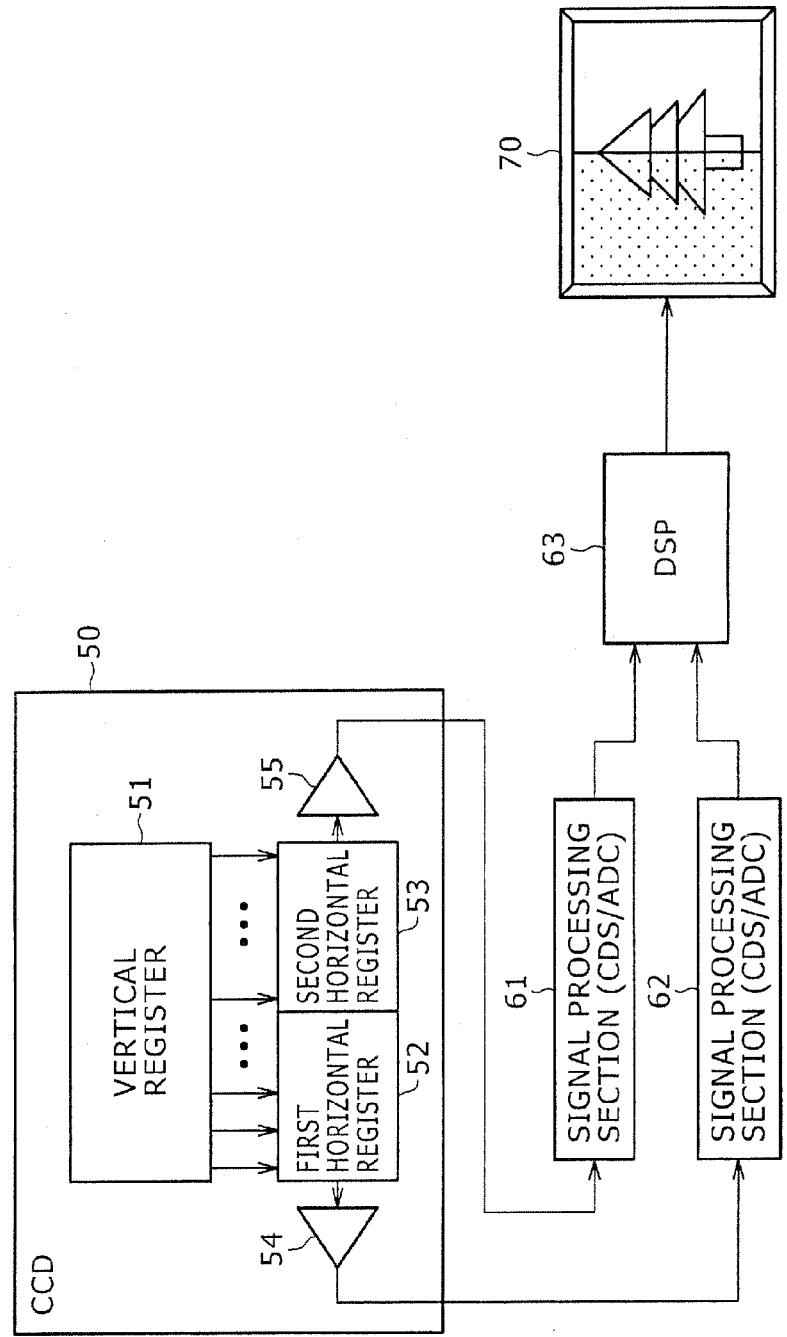
FIG. 2 is a block diagram showing a CCD unit of the two-channel output type and an associated signal processing configuration.

The image pickup apparatus shown includes a CCD unit 100 having a 2-channel output configuration wherein it is divided into a plurality of portions, that is, a plural-channel output configuration which outputs a signal in a unit of a divisional region of an image pickup device similarly to the configuration of the CCD unit described hereinabove with reference to FIG. 2. A detailed configuration of the CCD unit 100 is described below with reference to FIG. 4. It is to be noted that, while the embodiment described below is directed to an example of a configuration which uses a CCD unit as an image pickup device, the present invention can be applied also to another configuration which uses not a CCD unit but a CMOS unit as an image pickup device.

Figure 4:
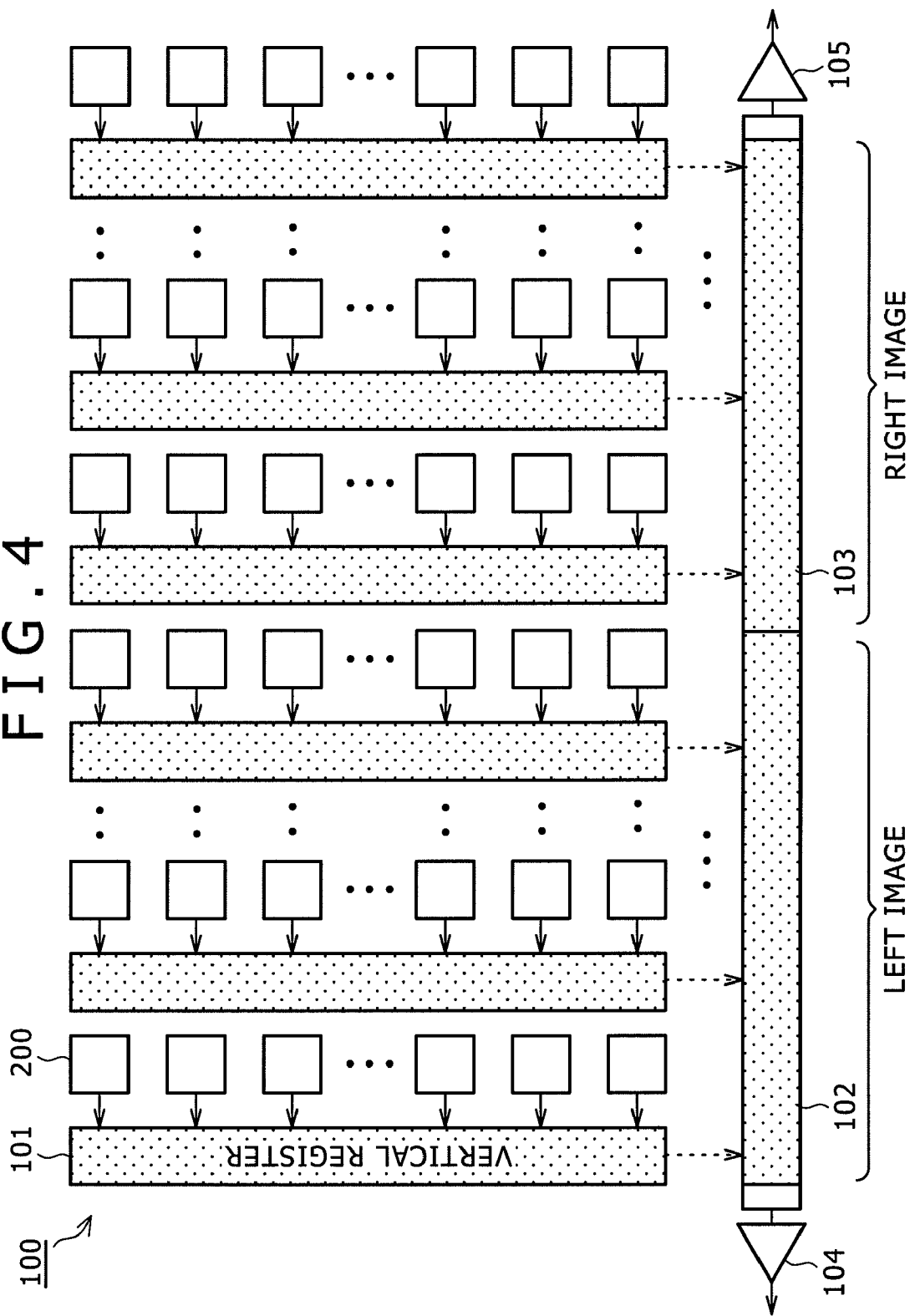
FIG. 4 is a block diagram showing a detailed configuration of an image pickup device employed in the image pickup apparatus of FIG. 3.

Referring to FIG. 4, the CCD unit 100 includes a large number of photodetectors (PDs) 200 as photoelectric conversion elements and outputs voltage signals based on charge accumulated in the photodetectors 200. The image pickup region for one screen of the CCD unit 100 is divided at the center in the horizontal direction into two divisional regions, and the CCD unit 100 outputs pixel information of different channels from the two divisional regions. The CCD unit 100 further includes a vertical register 101, and horizontal registers 102 and 103 for one line. The vertical register 101 is a register for transferring charge accumulated in the photodetectors 200 in a unit of one line in the vertical direction.

The horizontal registers 102 and 103 transfer charge for one line transferred thereto from the vertical register 101 in a unit of one pixel in the horizontal directions and input the charge information to output amplifiers 104 and 105 which convert the charge information into voltages and amplify the voltages. The output amplifiers 104 and 105 output the charge information corresponding to the divisional images as voltage signals. In this manner, the image information generated by the photodetectors (PDs) 200 of the CCD unit 100 is outputted from two output channels through the two output amplifiers 104 and 105.

In particular, the first horizontal register 102 outputs signals based on charge information outputted from the photodetectors (PDs) 200 included in the region of the left image through the output amplifier 104. Meanwhile, the horizontal register 103 outputs signals based on charge information outputted from the photodetectors 200 included in the region of the right image through the output amplifier 105.

Referring back to FIG. 3, processing of the output signals of the output amplifiers 104 and 105 is described. The output of the output amplifier 104 which is image signal information corresponding to the left side image of the CCD unit 100 is inputted to a signal processing section 111. The signal processing section 111 includes a CDS circuit for executing removal of noise in the input signal, an ADC circuit for carrying out AD conversion and so forth. The components of the signal processing section 111 carry out signal processing to produce digital signals of, for example, 14 bits from an analog signal. The digital signals are inputted to a digital signal processor (DSP) 120, by which an output image production process including a pixel value correction process is carried out for the digital signals. Then, a resulting signal is outputted from the DSP 120.

Meanwhile, the output of the output amplifier 105 which is image signal information corresponding to the right side image of the CCD unit 100 is inputted to a signal processing circuit 112. Also the signal processing circuit 112 includes a CDS circuit for executing removal of noise in the input signal, an ADC circuit for carrying out AD conversion and so forth. The components of the signal processing circuit 112 carry out signal processing to produce digital signals of, for example, 14 bits. The digital signals are inputted to the DSP 120, by which an output image production process including a pixel value correction process is carried out for the digital signals. Then, a resulting signal is outputted from the DSP 120.

In the processing configuration described above, the signal processing section 111 receives left image data of the CCD unit 100 as an input thereto and carries out signal processing for the left image data. Meanwhile, the signal processing section 112 receives right image data of the CCD unit 100 as an input thereto and carries out signal processing for the right image data. In particular, each of the signal processing sections 111 and 112 converts analog data representative of pixel values of pixels included in the corresponding image region into digital data and outputs the digital data.

The digital data are inputted to the DSP 120, by which an image correction process is carried out for the digital data.

The image pickup apparatus is configured such that the CCD unit 100 is divided into a plurality of regions and output amplifiers of different characteristics are used for data outputs of the channels. Therefore, there is the possibility that characteristics of output voltages may have a difference originating from a characteristic difference between the output amplifiers 104 and 105. The image pickup apparatus of the present embodiment makes it possible to produce well-balanced output images of high quality having appropriate black levels determined for the left and right image regions even where such a characteristic difference as described above exists. The more specific description will be described below.

The digital data produced by the signal processing sections 111 and 112 are inputted to and subjected to an image correction process by the DSP 120. The DSP 120 reads outputs corresponding to optical black (OB) regions as light intercepting regions set in the left and right image regions and calculates clamp levels for the left and right image regions.

Figure 5:
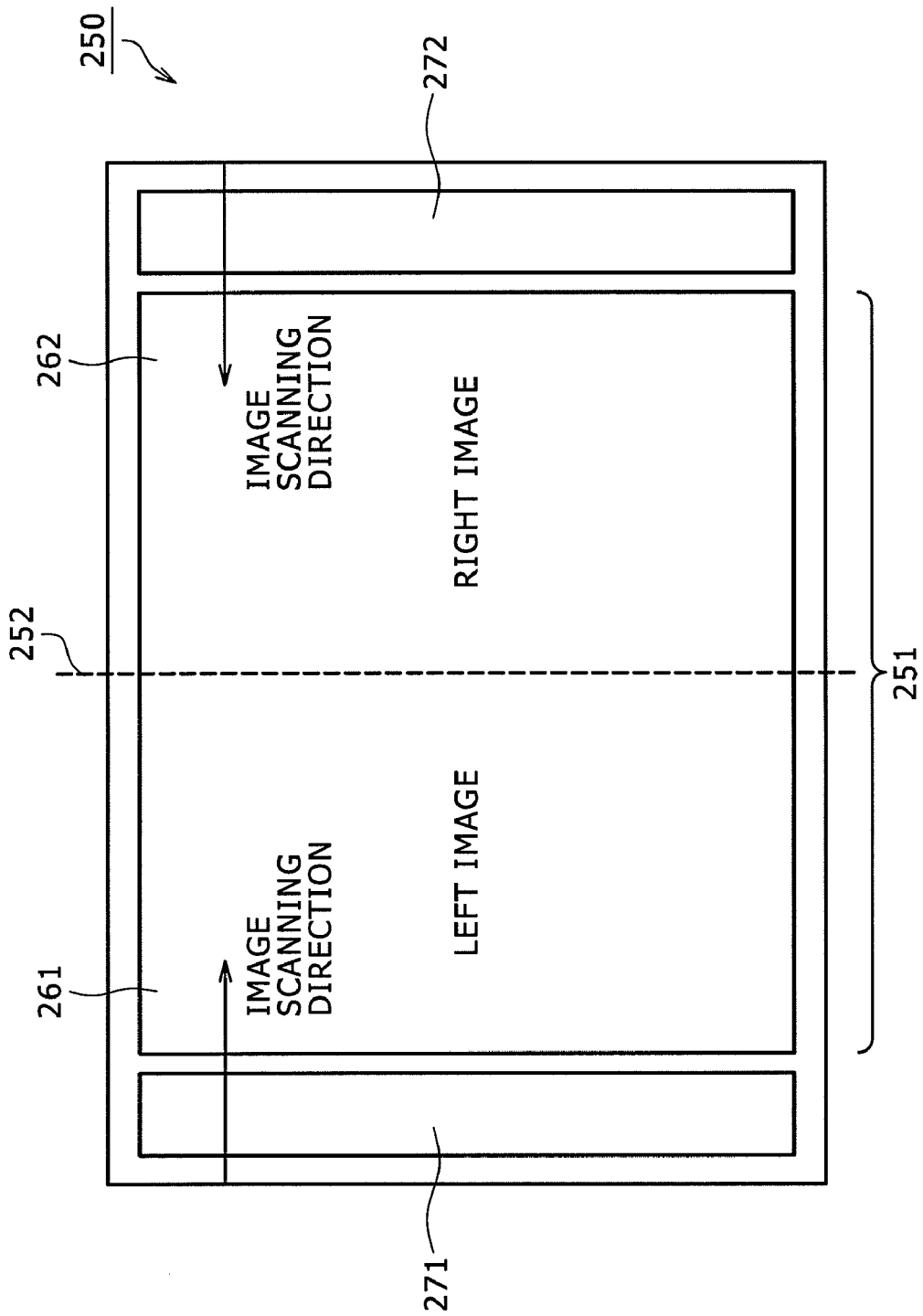
FIG. 5 is a schematic view showing a detailed configuration of the image pickup device.

The optical black (OB) regions as light intercepting regions are set individually for the left image region and the right image region. FIG. 5 shows an example of a configuration of an image pickup device 250 used in the image pickup apparatus of the present embodiment. Referring to FIG. 5, the image pickup device 250 includes an effective image region 251 for receiving light inputted in an image pickup process and accumulating signals for image formation, and optical black (OB) regions 271 and 272 set around the effective image region 251 and formed as light intercepting regions which basically do not input light upon an image pickup process. The effective image region 251 includes a left image region 261 positioned on the left side of an image boundary 252 and a right image region 262 positioned on the right side of the image boundary 252.

As seen in FIG. 5, the optical black (OB) regions are set as the left image OB region 271 and the right image OB region 272 corresponding to the image regions. As described hereinabove, the left image and the right image of the image pickup device are outputted through different output paths. In the image pickup device of FIG. 5, signals of the left image region 261 and the left image OB region 271 on the left side of the image boundary 252 are inputted through the output amplifier 104 shown in FIGS. 3 and 4 to and processed by the signal processing section 111. Meanwhile, signals of the right image region 262 and the right image OB region 272 on the right side of the image boundary 252 are inputted through the output amplifier 105 shown in FIGS. 3 and 4 to and processed by the signal processing section 112.

The DSP 120 reads digital outputs corresponding to the left image OB region 271 and the right image OB region 272 which are light intercepting regions set in the left and right image regions, respectively, and calculates clamp levels for the left and right image regions. A clamp level is a digital value representative of a pixel value level corresponding to a value of current, that is, dark current, which latently appears even when no light is received.

A reading timing of the clamp level (OBL) for the left image region and the clamp level (OBR) for the right image region of the DSP 120 is described below with reference to FIG. 6. In the example illustrated, the left image OB region 271 and the right image OB region 272 have a size of 40 pixels, and the effective image region 251 has a size of 1,228 pixels for each of the left and right images.

The DSP 120 reads digital data representative of the pixel levels individually corresponding to the left image OB region 271 and the right image OB region 272 and uses the read signals as clamp levels individually for the left and right image regions.

Figure 6:
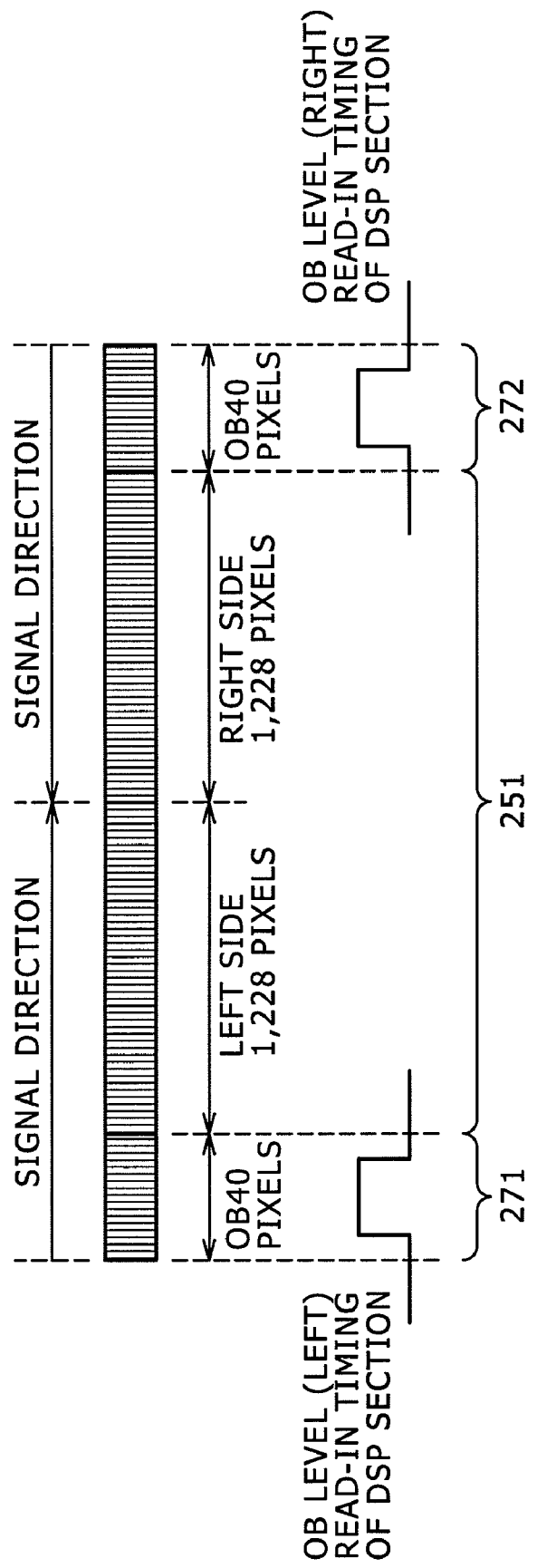
FIG. 6 is a diagrammatic view showing a regional configuration of the image pickup device.

The timing at which the clamp level is read in from each of the left image OB region 271 and the right image OB region 272 is set to central 30 pixels from among 40 pixels in each of the left image OB region 271 and the right image OB region 272 as seen in FIG. 6. The clamp level read-in timing of the DSP 120 corresponds to the High level in FIG. 6.

The clamp level (OBL) for the left image region and the clamp level (OBR) for the right image region are stored into the memory 152 through a control section (MPU) 150. Thereafter, in an image correction process by the DSP 120, the clamp levels stored in the memory 152 are outputted to execute an image correction process. In the following, the correction process is described with reference to FIG. 7 and so forth.

As described hereinabove, the clamp levels are determined based on the current values, that is, the black current values, of the optical black (OB) regions formed as light intercepting regions in the image pickup section. However, since signals of the left image OB region 271 on the left side and the right image OB region 272 on the right side of the image boundary 252 are processed by different output amplifiers from each other as seen in FIG. 5, a difference appears between the signal characteristics. A similar characteristic difference appears also between signals of the left image region 261 and the right image region 262 of the effective image region 251. In the image pickup apparatus of the present embodiment, even where such a characteristic difference as just described exists, an image correction process is carried out by the DSP 120 such that appropriate black levels are set individually for the left and right image regions to produce well-balanced output images of high quality.

Details of the image correction process by the DSP 120 are described. First, a target black level is determined in advance. For example, where the signal processing sections 111 and 112 output 14-bit data as digital data of pixel values, the pixel value level has digital values from 0 to 13,683 as minimum luminance to maximum luminance. In this setting, the target level luminance value is set, for example, as [960].

Figure 7:
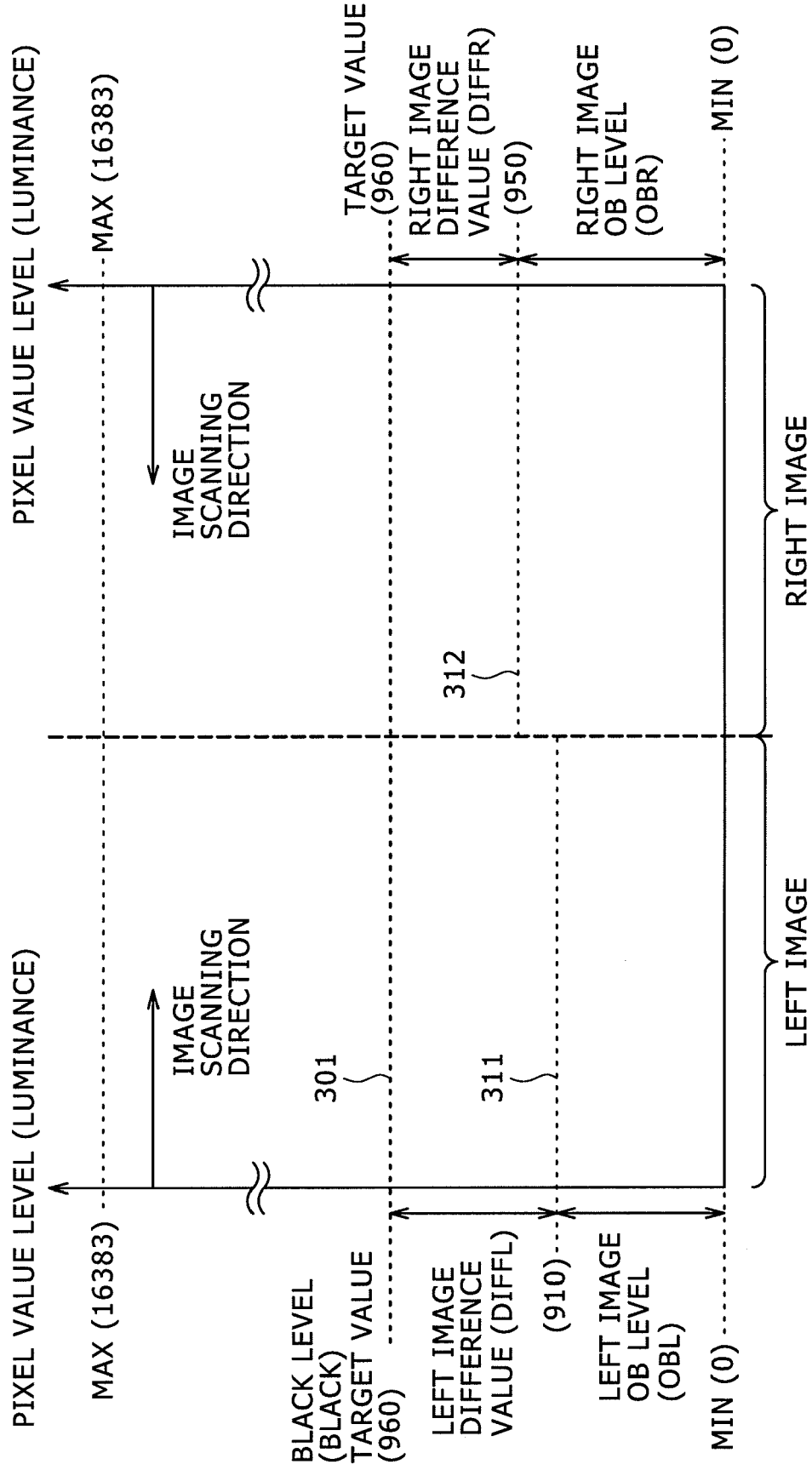
FIG. 7 is a diagrammatic view illustrating details of processing by the image pickup apparatus and the image signal processing circuit.

Referring to FIG. 7, the axis of ordinate indicates the pixel value or luminance from 0 to 13,683, and a left image and a right image are shown. The line indicating the target black level [960] is shown as a target black level 301.

Then, the clamp levels (OBL) and (OBR) corresponding to the left and right image regions are measured. They correspond to signal levels of signals generated based on current flowing in the light intercepting state. Basically, a digital value obtained from a signal obtained from the left image OB region 271 shown in FIG. 5 is a left image clamp level 311 [luminance level=910] shown in FIG. 7, and a digital value obtained from a signal obtained from the right image OB region 272 shown in FIG. 5 is a right image clamp level 312 [luminance level=950] shown in FIG. 7. It is to be noted that the [left image OB (Optical Black) level] shown in FIG. 7 signifies the clamp level for the left image region, and the [right image OB (Optical Black) level] signifies the clamp level for the right image region.

Thereafter, a lens cap or the like is used to intercept light to the image pickup apparatus so that no exposure may occur, and an image outputted from the camera is outputted to a display section such that, while the display is observed, the clamp level of each channel is adjusted so that digital image data outputted from the channels corresponding to the left and right image regions may become equal to the target black level [960]. Then, the difference from the target black level is calculated.

For example, the clamp level for the left image region is adjusted to the left image clamp level 311 [luminance level=910] as seen in FIG. 7 and the clamp level for the right image region is adjusted to the right image clamp level 312 [luminance level=950] as seen in FIG. 7 so that the luminance level of the display of the effective image region 251 outputted from the camera becomes equal to the black level target value [luminance level=960] as seen in FIG. 7.

At this time, the differences between the clamp levels for the output channels corresponding to the left and right image regions and the target black level are calculated in accordance with the following expressions.

In particular, the left image difference [DIFFL] which is a difference between the left image clamp level [OBL=910] and the target black level [960] is calculated in accordance with DIFFL=target black level−left image clamp level

=960−910

=50

Meanwhile, the right image difference [DIFFR] which is a difference between the right image clamp level [OBL=950] and the target black level [960] is calculated in accordance with DIFFR=target black level−right image clamp level

=960−950

=10

Figure 3:
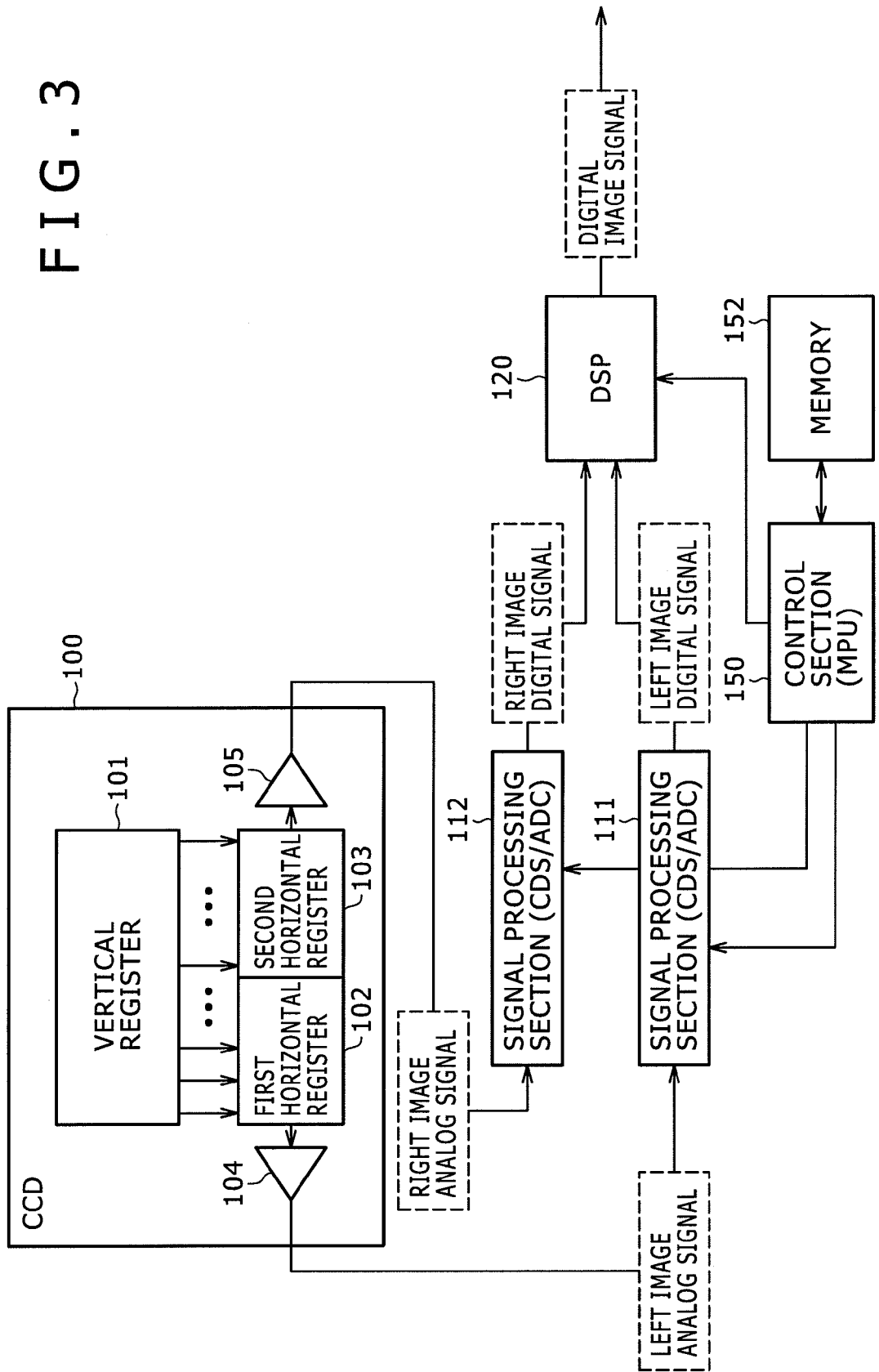
FIG. 3 is an example of a configuration of an image pickup apparatus and an image signal processing circuit to which the present invention is applied.

The difference values [DIFFL] and [DIFFR] are stored into the memory 152 of the image pickup apparatus shown in FIG. 3. The values of the left image difference [DIFFL] and the right image difference [DIFFR] stored in the memory 152 are outputted to and utilized for pixel value correction by the DSP 120. It is to be noted that, while, in the example described above, both of the left image difference [DIFFL] and the right image difference [DIFFR] are calculated as positive values higher than 0, there is no problem even if any of them has the value 0 or a negative value. In particular, there is no problem since they are retained and utilized as binary data represented by complements of 2 in and by the memory 152 and the DSP 120.

While the values of the left image difference [DIFFL] and the right image difference [DIFFR] are inputted to and utilized for pixel value correction by the DSP 120, in the image pickup apparatus according to the present embodiment, the correction amounts for the difference values [DIFFL] and [DIFFR] can be increased or decreased by an external input through a user inputting section or the like.

In particular, where the image correction differences for the left and right images to be utilized for the image correction process to be executed by the DSP 120 are represented respectively by left image correction difference [DIFFL(new)] and right image correction difference [DIFFR(new)] and the correction amounts to be externally inputted are represented respectively by left image correction amount [CORR_LEFT] and right image correction amount [CORR_RIGHT]

the left image correction difference [DIFFL(new)] and the right image correction difference [DIFFR(new)] are respectively given, using the left image difference [DIFFL] and right image difference [DIFFR] and the left image correction amount [CORR_LEFT] and right image correction amount [CORR_RIGHT], by the following expressions:

DIFFL(new)=[DIFFL]+[CORR_LEFT]

DIFFR(new)=[DIFFR]+[CORR_RIGHT]

It is to be noted that the left image correction amount [CORR_LEFT] and the right image correction amount [CORR_RIGHT] are defined so that the user can finely adjust the black level. The basic value for the correction amount may be set to [0] so that they are not actually utilized. However, where the left image correction amount [CORR_LEFT] and the right image correction amount [CORR_RIGHT] are utilized, an image conforming to the liking of the user can be outputted, and correction amounts for the left and right images can be defined independently of each other so as to allow delicate black level adjustment.

Upon image correction of the left image, the DSP 120 receives the left image correction difference [DIFFL(new)], that is, (L1) DIFFL(new)=[DIFFL]+[CORR_LEFT], and
(L2) the clamp level (OBL) for the left image as a left image correction parameter as an input thereto and executes correction of the left image using the received parameter.

Meanwhile, upon image correction of the right image, the DSP 120 receives the right image correction difference [DIFFR(new)], that is, (R1) DIFFR(new)=[DIFFR]+[CORR_RIGHT], and
(R2) the clamp level (OBL) for the right image as a right image correction parameter as an input thereto and executes correction of the right image using the received parameter.

While the image correction process of the DSP 120 makes it possible to reproduce the black levels for the left and right images with fidelity using the clamp levels for the left and right images, it takes a countermeasure for preventing appearance of an offset between the left and right images. In particular, for the left image in the effective image region 251 shown in FIG. 5, the clamp level (OBL) corresponding to the signal level of the left image OB region is used to determine the left image parameter [DIFFL(new)]. Meanwhile, for the light image in the effective image region 251, the clamp level (OBL) corresponding to the signal level of the left image OB region is used to determine the right image parameter [DIFFR(new)]. As a result, an offset in black level between the left and right regions does not appear.

The DSP 120 reads in the levels of the left and right OB portions and averages the levels to calculate the level for the OB portions of the channels. However, if the value of the level is used as it is, then a difference appears between the level on the region boundary at the center of the screen of the effective pixel region and the black level read in from the OB portions. Therefore, the parameters DIFFL(new) and DIFFR(new) calculated formerly are read in and added to the levels of the OB portions of the channels to obtain accurate black levels for the correction object lines.

Where the clamp level for the left image is represented by OBL, the clamp level for the right image by OBR and the black level to be determined by BLACK, the black level to be determined is represented by the following expression:

BLACK=OBL+DIFFL(new)=OBR+DIFFR(new)

Details of the image correction process executed by the DSP 120 are described with reference to (1) and (2) of FIG. 8. (1) and (2) of FIG. 8 respectively show (1) a processing configuration of the DSP 120, and
(2) an input to and an output from the DSP 120 and transition of an image signal during a processing procedure.

Figure 8:
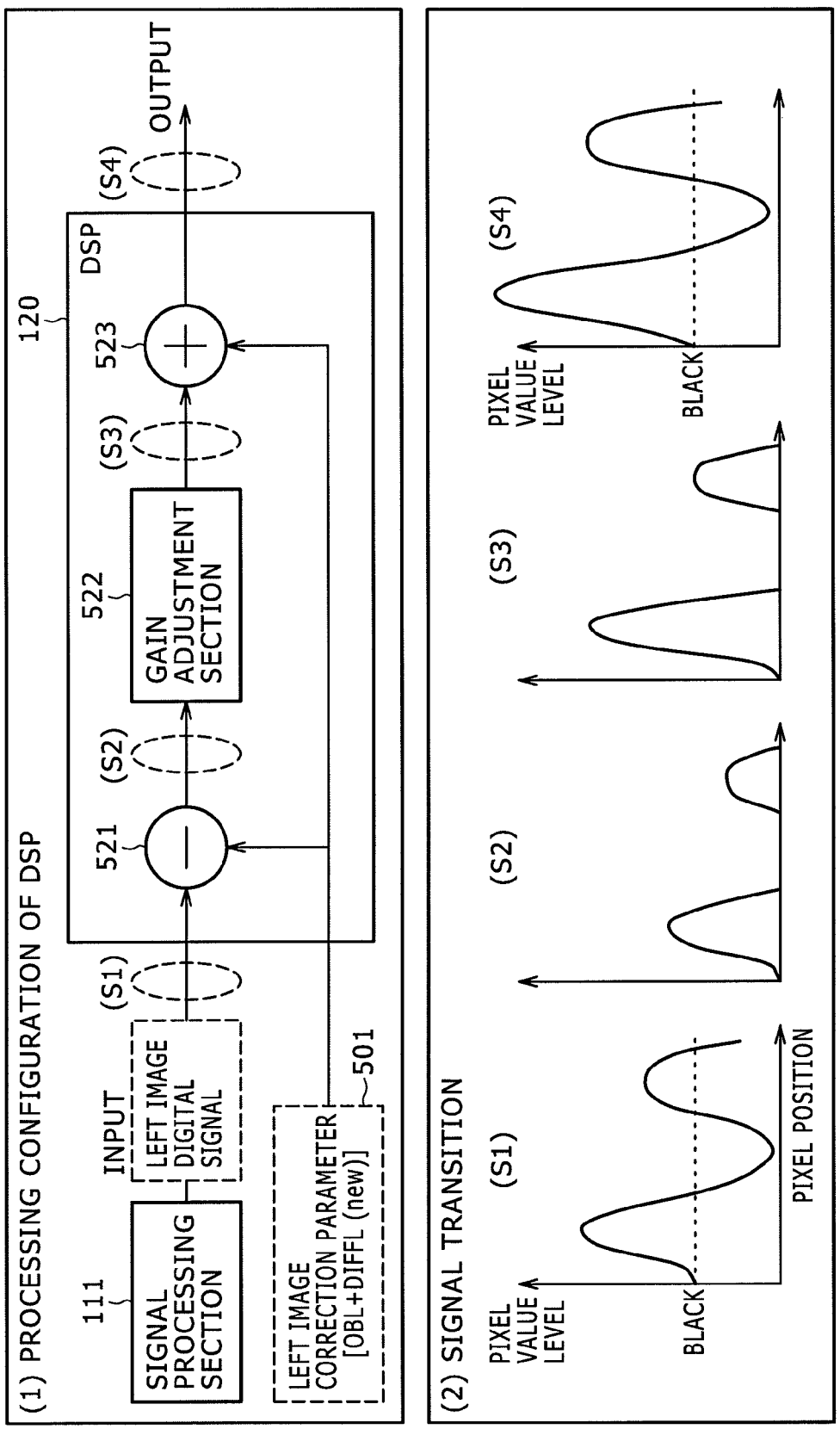
FIG. 8 is a diagrammatic view illustrating an image correction process of a DSP in the image pickup apparatus and the image signal processing circuit.

(1) of FIG. 8 illustrates an example of a process of the DSP 120 based on left image data inputted from the signal processing section 111 which produces digital data of a left image. If a left image is inputted, then the DSP 120 receives the parameter 501 as an input thereto and carries out correction for the left image. As described hereinabove, the parameter 501 is the sum value [OBL+DIFFL(new)] of the left image correction difference [DIFFL(new)], that is, (L1) DIFFL(new)=[DIFFL]+[CORR_LEFT], and
(L2) the clamp level (OBL) for the left image as described hereinabove.

As seen in (1) of FIG. 8, the DSP 120 includes a subtraction section 521, a gain adjustment section 522 and an addition section 523. Image signals corresponding to signal paths (S1) to (S4) shown in (1) of FIG. 8 are shown in (2) of FIG. 8. In particular, image signals of (S1) an output from the signal processing section 111, that is, an input to the DSP 120,
(S2) an output of the subtraction section 521,
(S3) an output of the gain adjustment section 522, and
(S4) an output of the addition section 523, that is, an output of the DSP 120 are seen in (2) of FIG. 8. The signals shown in (2) of FIG. 8 are represented as graphs illustrating a corresponding relationship between the pixel position and the pixel value or luminance level on a certain one line, that is, on a horizontal line. Horizontal broken lines represent a target black level BLACK, which is set, for example, to the luminance level [960] where the signal processing section 111 outputs 14-bit pixel data (0 to 16,383).

The signals S1 to S4 are individually described below.

First, the signal S1 is an output from the signal processing section 111 and an input to the DSP 120. The signal S1 is data indicated as (S1) in (2) of FIG. 8 and indicates various pixel values of pixels existing on one line.

If the data are inputted to the DSP 120, then the subtraction section 521 in the DSP 120 carries out a process of extracting, from the data, those data whose parameter 501 is higher than OBL+DIFFL(new)=960=target black level (BLACK) and subtracting the parameter 501, that is, OBL+DIFFL(new)

from the extracted data. For example, in the example illustrated in FIG. 7,

OBL=910 and

DIFFL=50 and, where the correction amount CORR_LEFT of the external input is 0,

OBL+DIFFL(new)=960=target black level(BLACK)

When the subtraction section 521 subtracts the left image correction parameter [OBL+DIFFL(new)=960] from the signal S1 of (2) of FIG. 8, the signal S2 of (2) of FIG. 8 is produced and inputted to the gain adjustment section 522.

The signal S2 represents data which do not include the low luminance portion of the luminance level of 960 which is the target black level and are remaining portions of the pixel values having a luminance level higher than 960 as a result of the subtraction of the original pixel value −960. It is to be noted that those pixel data having pixel values lower than the luminance level of 960 are maintained as they are as data which are not an object of processing.

The data signal S2 which does not include the low luminance portion of the luminance level of 960 which is the target black level and represents remaining portions of the pixel values having a luminance level higher than 960 as a result of the subtraction of the original pixel value −960 is inputted to the gain adjustment section 522. The gain adjustment section 522 carries out gain amplification of the input signal S2, that is, a level extension process of extending the section of the inputted pixel values. For example, where the pixel values included in the input signal S2 are 0 to 1,000, the gain adjustment section 522 executes a process of extending the section of the pixel values 0 to 1,000 to another section of the pixel values of 0 to 1,500.

As a result, a signal shown as (S3) in (2) of FIG. 8 is produced. It is to be noted that, while, in the present example, the data used are monochromatic data having only a luminance level and the gain adjustment section 522 carries out gain adjustment based on one gain adjustment level, for example, where correction of a color image is to be carried out otherwise, preferably different gain levels are set for R, G and B pixels to carry out gain adjustment.

By the gain adjustment described above, the signal whose pixel value level is increased from that of (S2) is produced as represented by the signal S3 in (2) of FIG. 8. Such gain adjustment is carried out only for those pixels which originally have a pixel value higher than the black level of 960.

The signal S3 is inputted to the addition section 523. The addition section 523 adds, to the signal after the gain adjustment for those pixels which have a luminance level higher than the black level (BLACK=960), the black level (BLACK=960). Further, the addition section 523 additionally inserts the pixel data, which originally have a pixel value lower than the luminance level of 960 and have been maintained as data which are not an object of processing, to produce a signal S4 to be outputted as output data.

It is to be noted that, while the example illustrated in (1) and (2) of FIG. 8 is a process for the left image, a similar process is executed also for the right image. However, the processing for the right image is carried out after the right image correction parameter, that is, OBR+DIFFR(new)

is inputted.

Further, while the processing example described above utilizes the correction difference [DIFFL(new)], the difference value [DIFFL] which does not include a correction amount may alternatively be used for such processing.

When the DSP 120 carries out a process for the left image and a process for the right image, it is necessary to switchably utilize the correction parameter. A parameter input changeover process configuration is described below with reference to FIG. 9.

Figure 9:
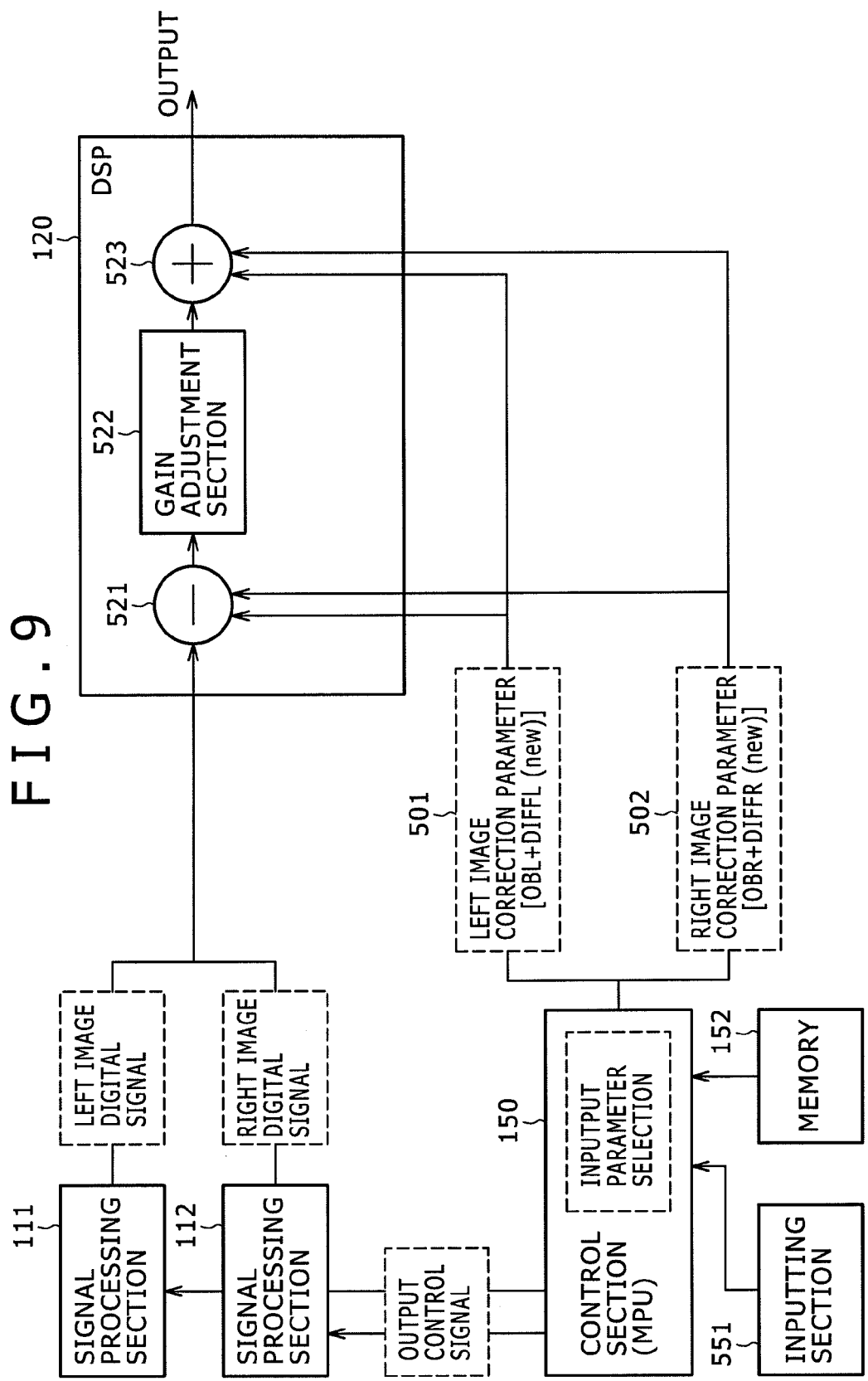
FIG. 9 is a block diagram illustrating the image correction process of the DSP.

Referring to FIG. 9, there is shown a DSP 120 which includes a subtraction section 521, a gain adjustment section 522 and an addition section 523 similarly to that shown in FIG. 8. To the DSP 120, digital data of a left image are inputted from the signal processing section 111 and digital data of a right image are inputted from the signal processing section 112.

The inputting timings are controlled by the control section (MPU) 150. In addition to the inputting control, the control section 150 executes a process of changing over the correction parameter to be outputted to the DSP 120.

In particular, when digital data of the left image are inputted from the signal processing section 111 to the DSP 120, a left image correction parameter 501, that is, OBL+DIFFL(new)

is inputted to the DSP 120.

On the other hand, when digital data of the right image are inputted from the signal processing section 112 to the DSP 120, a right image correction parameter 502, that is, OBR+DIFFR(new)

is inputted to the DSP 120.

It is to be noted that values of the difference values [DIFFL] and [DIFFR] which do not include correction amounts are stored in the memory 152, and the control section 150 acquires the values from the memory 152 and outputs the values to the DSP 120.

An inputting section 551 receives, from the user, external input correction amounts, that is,
a left image correction amount [CORR_LEFT] and
a right image correction amount [CORR_RIGHT] as inputs thereto.

In image correction of the left image, the DSP 120 receives the left image correction difference [DIFFL(new)], that is,
(L1) DIFFL(new)=[DIFFL]+[CORR_LEFT], and
(L2) the clamp level (OBL) for the left image as the left image correction parameter 501 as an input thereto and executes correction of the left image using the left image correction parameter 501. In image correction of the right image, the DSP 120 receives the right image correction difference [DIFFR(new)], that is,
(R1) DIFFR(new)=[DIFFR]+[CORR_RIGHT], and
(R2) the clamp level (OBL) for the right image as the right image correction parameter 502 as an input thereto and executes correction of the right image using the right image correction parameter 502.

Figure 10:
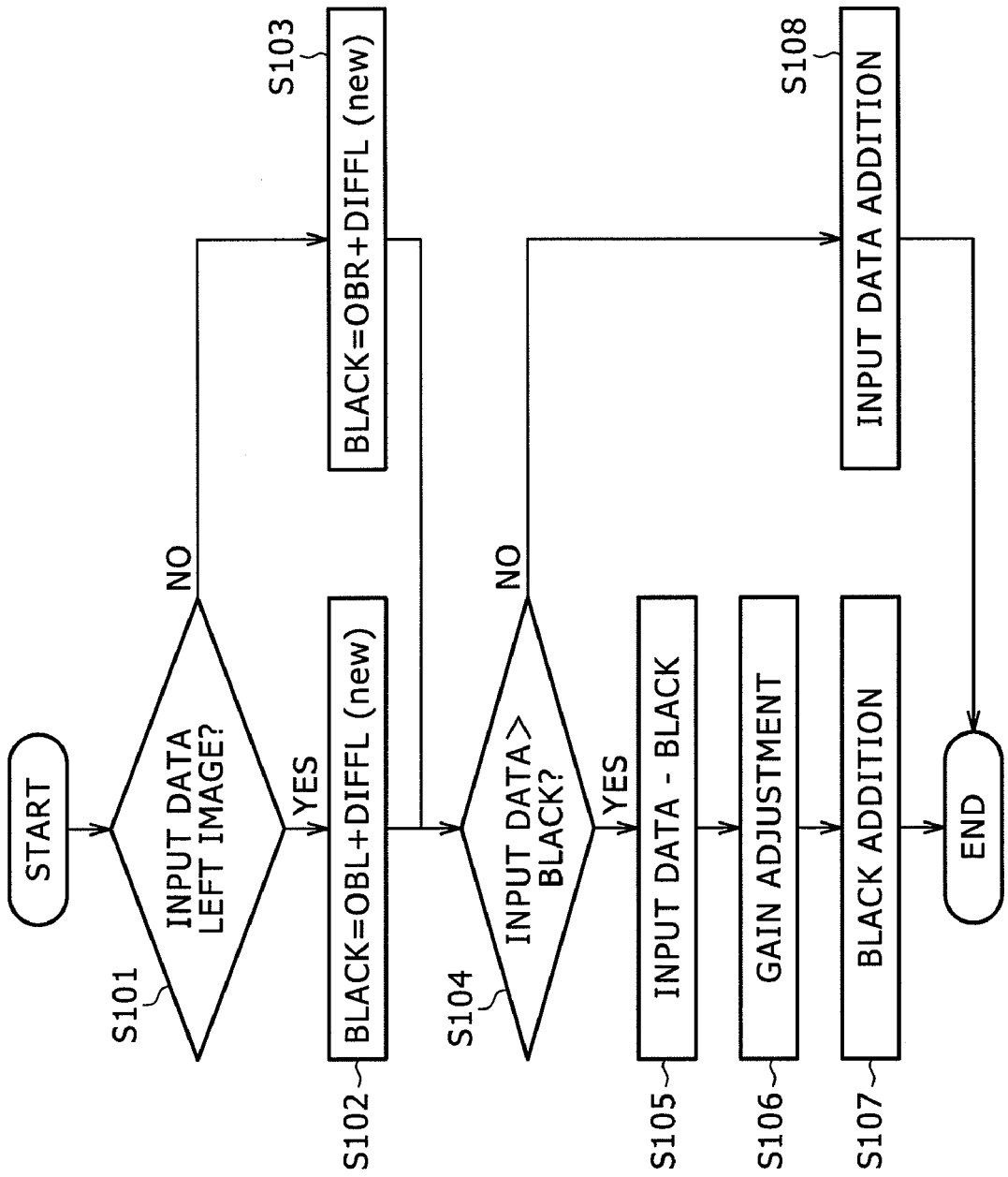
FIG. 10 is a flow chart illustrating an image correction processing sequence by the image pickup apparatus and the image signal processing circuit.

An image correction process sequence by the DSP 120 is described with reference to a flow chart of FIG. 10. The process of the flow chart shown in FIG. 10 is carried out by processing of the control section 150 and the DSP 120. First at step S101, it is determined whether left image data or right image data should be used as input image data to the DSP 120. This process is executed by the control section 150.

Where the input image data to the DSP 120 are left image data, the control section 150 inputs the left image correction parameter, that is, OBL+DIFFL(new)

to the DSP 120 at step S102. It is to be noted that the left image correction parameter [OBL+DIFFL(new)] is equal to the target black level [BLACK], that is, BLACK=OBL+DIFFL(new)

On the other hand, where the input image data to the DSP 120 are right image data, the control section 150 inputs the right image correction parameter, that is, OBR+DIFFR(new)

to the DSP 120 at step S103. It is to be noted that the left image correction parameter [OBR+DIFFR(new)] is equal to the target black level [BLACK], that is, BLACK=OBR+DIFFR(new)

Processes at steps S104 to S108 are an image correction process executed by the DSP 120 and correspond to the process described hereinabove with reference to FIG. 8. First at step S104, the DSP 120 selects those pixels which have a pixel value higher than the target black level [BLACK] from among the input image data and carries out the processes at steps S105 to S107 for the selected pixels.

The process at step S105 is executed by the subtraction section 521 of the DSP 120 shown in FIG. 8 and is subtraction, from the pixel data having a pixel value higher than the target black level [BLACK], of the target black level [BLACK], that is, of OBL+DIFFL(new) for the left image, but of OBR+DIFFR(new) for the right image.

In short, the signal S2 of (2) of FIG. 8 is produced from the signal S1 of (2) of FIG. 8.

Then at step S106, gain adjustment is carried out. This process is executed by the gain adjustment section 522 of the DSP 120 shown in FIG. 8 and is gain amplification of the input signal (that is, the signal S2 of (2) of FIG. 8), that is, a level extension process. As a result, a signal shown as the signal S3 of (2) of FIG. 8 is produced.

Then at step S107, an addition process is carried out. This process is carried out by the addition section 523 of the DSP 120 shown in FIG. 8. In particular, the addition section 523 adds the black level (for example, BLACK=960) to those pixel data which originally have a pixel value higher than the black level (for example, BLACK=960).

On the other hand, those pixel data which original have a pixel value lower than the luminance level of 960 and have been maintained as they are as data which are not an object of processing as a result of the process at step S104 are additionally inserted as they are maintaining the pixel values to produce an output signal. As a result, a signal represented by S4 of (2) of FIG. 8 is obtained as output data.

It is to be noted that, while the processing sequence of the example described above utilizes the correction difference value "DIFFL(new)" or "DIFFR(new)" is used as the image correction parameter, the difference value [DIFFL] or [DIFFR] which does not include a correction amount may alternatively be used for such processing.

Further, the procedure illustrated in the flow chart of FIG. 10 is executed repetitively for each line of the image of the object of processing. In particular, a correction parameter corresponding to each line, that is, OBL+DIFFL(new) for the left image, or OBR+DIFFR(new) for the right image is calculated and inputted to the DSP 120, by which correction is carried out using the correction parameter as a target black level.

Since the DSP 120 detects the luminance level of the OB portions to finely adjust the black levels for each line, even if the level outputted from the image pickup device is fluctuated, for example, by a temperature rise, since also the luminance levels of the OB portions fluctuate similarly, color reproducibility of high fidelity can always be implemented. Further, even if a level difference between regions caused by a dispersion in output amplifier characteristic of the image pickup device exists, since adjustment of the black level is carried out for each level, a black level offset does not appear.

Further, the user can set and input the correction amounts [CORR_LEFT] and [CORR_RIGHT] for fine adjustment as values independent of each other for the left and right images. Consequently, a process conforming to the liking of the user is implemented.

The present invention has been described in detail with reference to the particular embodiment thereof. However, it is apparent that one skilled in the art can modify or alter the embodiment without departing from the subject matter of the present invention. In particular, the present invention has been disclosed in the form of illustration, and the substance described in the present specification shall not be interpreted restrictively. In order to decide the subject matter of the present invention, the claim should be referred to.

Further, the series of processes described above can be executed by hardware, by software or by a composite configuration of hardware and software. Where the series of processes is executed by software, a program which describes the processing sequence can be installed into a memory in a computer incorporated in hardware for exclusive use so as to be executed by the computer or can be installed into a general-purpose computer which can execute various processes so as to be executed by the computer. For example, the program can be recorded in advance on a recording medium. It is possible not only to install the program from a recording medium into a computer but also to receive the program through a network such as a LAN (Local Area Network) or the Internet and install the program into a recording medium such as a built-in hard disk.

It is to be noted that the various processes described herein may be but need not necessarily be processed in a time series in the order as described and may be executed in parallel or individually depending upon the processing capacity of the apparatus which executes the processes or as occasion demands. Further, in the present specification, the term "system" is used to represent a logical set configuration composed of a plurality of apparatus which may not necessarily be accommodated in the same housing.

In summary, with the configuration of the embodiment described above, where output signals corresponding to divisional regions of an image pickup device are inputted to execute a correction process therefor, the digital signal processing section (DSP) receives correction parameters individually corresponding to the divisional regions as inputs thereto to carry out image correction. In particular, the digital signal processing section receives, as each of the parameters, a sum value of (a) a clamp level value corresponding to that one of the divisional regions which is an object of correction and (b) a difference value between the clamp level value corresponding to the divisional region which is an object or correction and a target black level, as an input thereto. Then, the digital signal processing section executes image correction with reference to a black level determined based on the received correction parameter. By the configuration described, even if a level difference originating from a dispersion of the output amplifier characteristic of the image pickup device exists between the regions, since adjustment of the black level is carried out by a process to which the correction parameter for each region, appearance of an offset of the black level between the image regions is prevented and image data of high quality can be outputted.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus, comprising:
an image pickup section of a plural channel output type configured to output signals individually corresponding to divisional regions of an image pickup device;
a plurality of signal processing sections configured to individually receive the output signals of the plural channels of said image pickup device as inputs thereto to produce digital data corresponding to pixel values, and
a digital signal processing section configured to receive the pixel value data produced by said signal processing sections as inputs thereto to execute an image correction process, said digital signal processing section being configured to receive, in the image correction process for the divisional regions, correction parameters individually corresponding to the divisional regions to carry out image correction, each of the correction parameters being a sum value of (a) a clamp level value corresponding to that one of the divisional regions which is an object of correction, and (b) a difference value between the clamp level value corresponding to the divisional region which is the object of correction and a target black level, said digital signal processing section being further configured to determine black levels based on the correction parameters inputted thereto and execute image correction with reference to the determined black levels.

2. The image pickup apparatus according to claim 1, wherein said digital signal processing section includes a gain control section configured to execute a level extension process of selecting, from among component pixels in input image data thereto, only those pixels which have a pixel value higher than the target black level and extending a section of input pixel values by gain control, and outputs resulting data of the gain control for the pixels which have a pixel value higher than the target black level and pixel values of those of the component pixels of the input image which have a pixel value lower than the target black level while the pixel values are maintained.

3. The image pickup apparatus according to claim 1, wherein said image pickup section includes, as the image pickup device thereof, an image pickup device of the two-part type capable of outputting a left image and a right image and outputs a plurality of output signals individually corresponding to the left image and the right image, said digital signal processing section being configured to receive, in the image correction process for the divisional regions, the correction parameters individually corresponding to the divisional regions as inputs thereto and carry out the image correction to execute the image correction such that, in the process wherein the left image is determined as the object of processing, said digital signal processing section receives a sum value of (La) a clamp level corresponding to the left image and (Lb) a difference value between the clamp level value corresponding to the left image and the target black level as the correction parameter as an input thereto and executes the image correction with reference to a black level determined based on the correction parameter whereas, in the process wherein the right image is determined as the object of processing, said digital signal processing section receives a sum value of (Ra) a clamp level corresponding to the right image and (Rh) a difference value between the clamp level value corresponding to the right image and the target black level as the correction parameter as an input thereto and executes the image correction with reference to a black level determined based on the correction parameter.

4. The image pickup apparatus according to claim 3, wherein said digital signal processing section utilizes correction difference values which are sums of externally inputted correction amounts individually corresponding to the left and right images and the corresponding difference values as component data of the correction parameters to execute the processes.

5. An image signal processing circuit, comprising:

a plurality of signal processing sections configured to individually receive signals corresponding to divisional regions of an image pickup device as inputs thereto to produce digital data corresponding to pixel values; and a digital signal processing section configured to receive the pixel value data produced by said signal processing sections as inputs thereto to execute an image correction process, said digital signal processing section being configured to receive, in the image correction process for the divisional regions, correction parameters individually corresponding to the divisional regions to carry out image correction, each of the correction parameters being a sum value of (a) a clamp level value corresponding to that one of the divisional regions which is an object of correction, and (b) a difference value between the clamp level value corresponding to the divisional region which is the object of correction and a target black level, said digital signal processing section being further configured to determine black levels based on the correction parameters inputted thereto and execute image correction with reference to the determined black levels.

6. An image signal processing method executed by an image processing apparatus, comprising:

a signal processing step executed by a plurality of signal processing sections of individually receiving signals corresponding to divisional regions of an image pickup device as inputs thereto to produce digital data corresponding to pixel values; and a digital signal processing step executed by a digital signal processing section of receiving the pixel value data produced by the signal processing sections as inputs thereto to execute an image correction process, the digital signal processing step including reception, in the image correction process for the divisional regions, of correction parameters individually corresponding to the divisional regions to carry out image correction, each of the correction parameters being a sum value of (a) a clamp level value corresponding to that one of the divisional regions which is an object of correction, and (b) a difference value between the clamp level value corresponding to the divisional region which is the object of correction and a target black level, the digital signal processing step further including determination of black levels based on the correction parameters inputted thereto and execution of image correction with reference to the determined black levels.

7. A computer program, embodied on a non-transitory computer readable medium, for causing an image processing apparatus to execute an image signal process, comprising:

a signal processing step executed by a plurality of signal processing sections of individually receiving signals corresponding to divisional regions of an image pickup device as inputs thereto to produce digital data corresponding to pixel values; and a digital signal processing step executed by a digital signal processing section of receiving the pixel value data produced by the signal processing sections as inputs thereto to execute an image correction process, the digital signal processing step including reception, in the image correction process for the divisional regions, of correction parameters individually corresponding to the divisional regions to carry out image correction, each of the correction parameters being a sum value of
(a) a clamp level value corresponding to that one of the divisional regions which is an object of correction, and
(b) a difference value between the clamp level value corresponding to the divisional region which is the object of correction and a target black level,
the digital signal processing step further including determination of black levels based on the correction parameters inputted thereto and execution of image correction with reference to the determined black levels.

8. An image pickup apparatus, comprising:

image pickup means of a plural channel output type for outputting signals individually corresponding to divisional regions of an image pickup device;

plurality of signal processing means for individually receiving the output signals of the plural channels of said image pickup device as inputs thereto to produce digital data corresponding to pixel values, and digital signal processing means for receiving the pixel value data produced by said signal processing means as inputs thereto to execute an image correction process, said digital signal processing means receiving, in the image correction process for the divisional regions, correction parameters individually corresponding to the divisional regions to carry out image correction, each of the correction parameters being a sum value of
(a) a clamp level value corresponding to that one of the divisional regions which is an object of correction, and
(b) a difference value between the clamp level value corresponding to the divisional region which is the object of correction and a target black level, said digital signal processing means further determining black levels based on the correction parameters inputted thereto and execute image correction with reference to the determined black levels.

\* \* \* \* \*